United States Patent [19]

Kolb

[11] 4,305,639
[45] Dec. 15, 1981

[54] PLUG CONNECTION BETWEEN A THERMOFEELER AND A HOLDER

[75] Inventor: Gustav Kolb, Hemer, Fed. Rep. of Germany

[73] Assignees: Mannesmann Aktiengesellschaft, Dusseldorf; Firma Gustav Kolb, Garbeck, both of Fed. Rep. of Germany

[21] Appl. No.: 25,584

[22] Filed: Mar. 30, 1979

[30] Foreign Application Priority Data

Apr. 6, 1978 [DE] Fed. Rep. of Germany ....... 2815138

[51] Int. Cl.³ .............................................. H01R 13/10
[52] U.S. Cl. .................................................. 339/273 R
[58] Field of Search ......... 339/182 R, 182 RS, 182 T, 339/183, 244 R, 244 UC, 273 R, 273 F

[56] References Cited

U.S. PATENT DOCUMENTS

| | | | |
|---|---|---|---|
| 2,453,606 | 11/1948 | Ward et al. | 339/182 R |
| 2,858,351 | 10/1958 | Taylor | 339/273 R |
| 3,993,388 | 11/1976 | Konzorr | 339/273 R |

FOREIGN PATENT DOCUMENTS 2508410  9/1976  Fed. Rep. of Germany ... 339/244 R

Primary Examiner—Joseph H. McGlynn
Attorney, Agent, or Firm—Smyth, Pavitt, Siegemund & Martella

[57] ABSTRACT

The plug in U.S. Pat. No. 4,165,995 is improved as to the contact carrier by providing slots in an orientation so that thermocouple leads can be laterally inserted before hanging over ridges for contact-making with annular contacts of a socket member in the holder. The orientation of the slots permits lateral placement of the thermocouple leads through the ridges, but the leads will hang over them in a location azimuthally offset from the slot through the respective ridge.

8 Claims, 4 Drawing Figures

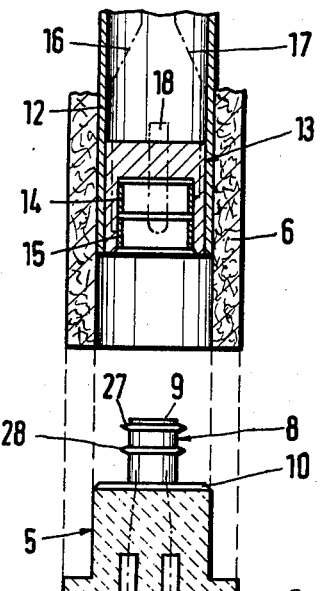
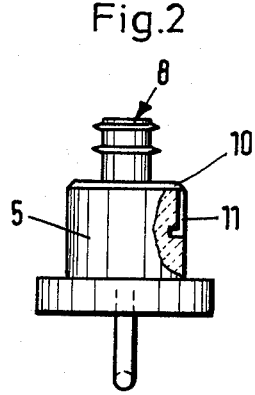
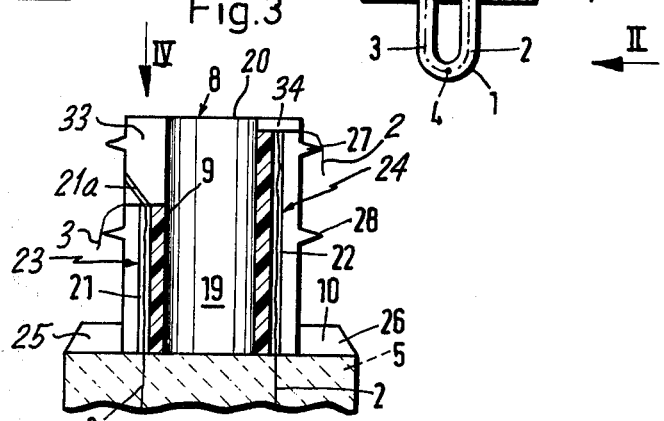
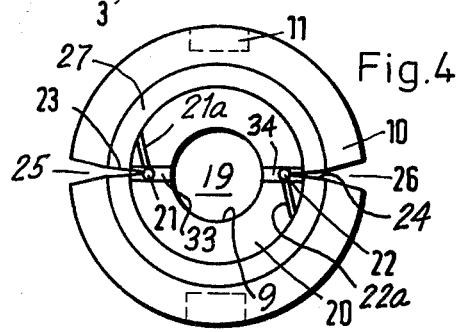

PLUG CONNECTION BETWEEN A THERMOFEELER AND A HOLDER

BACKGROUND OF THE INVENTION

In my U.S. Pat. No. 4,165,995, I describe a plug connection between an immersion-type thermofeeler and a tubular holder. The holder or lance carries a socket with and for contacts which directly make contact with the thermocouple leads. For this, one runs these leads into a carrier of insulating material having axially spaced annular ribs over which the leads hang freely. The carrier moreover has passages through which the leads pass. As the carrier is inserted into the socket, the rather weak leads make contact with the socket contacts in a plug-in type arrangement. This particular assembly was designed to permit direct and immediate connection and contact making between the socket contacts in the holder and the feeler without interposing additional wires which may alter the electrical characteristics of the thermofeeler. Thermoelectrically compatible intermediate wires have been used in the past, but they obviously complicate constructions.

The construction of a plug as per my patent above has been used with advantage and successfully. It was found, however, that threading the hardly visible thermocouple leads into and through the bores of the carrier is a rather cumbersome procedure. However, the basic principle of the plug construction involving the direct contact making between the thermocouple leads and holder, or lance, contacts must be maintained.

DESCRIPTION OF THE INVENTION

It is a particular object of this invention to improve constructions following the principles laid down in my Pat. No. 4,165,995 as far as guiding and running the leads into and through the carrier is concerned.

It is, therefore, an object of the present invention to improve thermocouple-connecting structures for use in measuring lances of the type in which the thermocouple is immersed in molten steel.

It is, therefore, a specific object and feature of the present invention to improve the plug connection between a thermofeeler or thermocouple and contacts of a tubular holder or lance whereby the holder is provided with a socket having contacts, including at least one annular contact and cooperating with a contact carrier on the thermocouple carrier; the contact carrier has at least one annular, radially outwardly tapering rib or ridge over which to hang one of the thermocouple leads which will make contact with the annular contact upon insertion of the contact carrier into the socket.

In accordance with the preferred embodiment of the present invention, the plug connection, in accordance with the specific object, is improved in that the contact carrier is provided with one or more axial ducts being at the bottom of a radial extending radially inwardly narrowing slot, extending axially for the length of the duct, the duct being contiguous with a slot having a tangential component and terminating above the rib. A thermocouple lead is laterally run into the axial duct, through the radial slot, and also into the tangential slot to hang over the rib.

It can thus be seen that the improvement is particularly related to the construction of the contact carrier, and it is, therefore, another object of the invention to improve such a contact carrier which permits a thin and weak lead to be hung easily over a ridge or rib which, upon coacting with a socket contact, urges the lead into contact engagement therewith.

DESCRIPTION OF THE DRAWINGS

While the specification concludes with claims particularly pointing out and distictly claiming the subject matter which is regarded as the invention, it is believed that the invention, the objects and features of the invention, and further objects, features and advantages thereof will be better understood from the following description taken in connection with the accompanying drawings in which:

FIG. 1 is a cross section of an exploded view of the lower end of a thermofeeler lance and holder and of a thermocouple carrier, showing also the plug elements for obtaining a connection between these parts;

FIG. 2 is a side view of a thermocouple carrier shown in FIG. 1 and as seen in accordance with arrow II in FIG. 1;

FIG. 3 is a section view of a portion of the carrier shown in FIG. 2, drawn to a larger scale; and FIG. 4 is a top view of the carrier as indicated by arrow IV in FIG. 1.

Proceeding now to the detailed description of the drawings, FIG. 1 shows a thermocouple which is comprised of two different wires 2 and 3 joined by soldering at a measuring point or junction 4 including junction 4. Portions of the wires, are contained in a U-shaped quartz tube 1. One of the wires may be made of platinum, the other one of platinum-rhodium. This is not essential, but these types of material are successfully used in thermofeelers for the purpose of measuring the temperature of molten steel.

The quartz tube 1 has the ends of its legs mounted in and secured to a thermocouple carrier 5. The ends of the wires or leads 2 and 3 traverse this carrier and have been molded into it. The main part of thermocouple carrier 5 is of cylindrical configuration and has such (radial) dimensions to fit tightly into the end of a tubular lance and holder 6, made conventionally of cardboard. Carrier 5 has a collar or flange 7, abutting against the lower end of lance tube 6 and preventing the carrier 5 from being pushed too deeply into the lance. Carrier 5 is made of a ceramic material.

Thermocouple carrier 5 carries a contact carrier 8, made of polyamid or the like. Carrier 8 has a flange, collar or shoulder 10 attached to a cylindrical body 9 which constitutes the main part of carrier 8. Flange or disk 10 is provided to secure carrier 8 to the axial end face of carrier 5. This physical connection is made by means of two claws or latches 11 which extend into matching grooves in the periphery of the cylindrical body of carrier 5. The claws 11 when inserted complete the outer periphery of this cylinder as to contour.

The lance tube 6 receives telescopically a tube 12, made of a material that is more durable than cardboard so that it can be reused. The lower end of tube 12 carries an inserted socket 13 which, together with carrier 8, constitutes the plug whereby the latter is inserted in the former. The hollow socket 13 is in its interior provided with a cylindrical contact arrangement which includes two coaxially arranged contact rings 14 and 15.

Conductors 16 and 17 are respectively connected to the contacts 14 and 15 and run through the interior of tube 12, up to the measuring equipment and circuit outside of the lance. The conductors 16 and 17 are preferably made of copper and the contacts 14 and 15 are of a copper alloy so that they all function as compensating conductors and are thermoelectrically compatible with the leads.

FIG. 1 shows further that one of the contact rings (14 and 15) may be replaced by a central contact pin 18 to be inserted in the central bore 19 of carrier 8. Additionally or alternatively, one may provide for further contact rings if, for example, the thermofeeler is provided with two thermocouples as shown in my copending patent and which are to be connected electrically in separate circuits.

The body 9 of carrier 8 is of hollow cylindrical configuration and has an annular end or front face 20. The tubular body 9 is provided with two longitudinal bores or ducts 21 and 22, being disposed in diametrally opposing locations and traversing the wall of body 9 in about the middle of its radial thickness dimension. Each bore or duct is actually the radial, inner end of radial and radially inwardly narrowing slots 23 and 24. The bores have a larger diameter than the ends proper of the slots or ducts and extend axially for the length of the respective ducts.

Slot 24 merges into a groove 34 in the front end 20 of body 9. Groove 34 extends through a full radial extension of the wall of tubular body 9, duct 22 terminates in the bottom of that groove. A slot 22a extends substantially tangentially from groove 34 above the end of duct 22 to reach the outer surface of body 9 laterally off the location of slot 24. Moreover, slot 22a runs parallel to the axis of cylindrical body 9. One can also say that axial slot 22a has an oblique orientation to begin in a sidewall of groove 34 and ends in the cylindrical periphery of body 9. The bottom (axially) of slot 22a is coplanar with the bottom of axial/radial groove 34.

Analogously, a rather deep axial/radial groove 33 is provided radially opposite to groove 34 into which merges duct 21. An oblique slot 21a extends substantially tangentially from one wall of groove 33 above the location where duct 21 ends and reaches the surface of body 9 laterally offset from slot 23.

More specifically, slot 21a has the following orientation: its plane of extension is oblique to the axis of cylindrical body 9, the angle can be taken from FIG. 3. The lower end of slot 21a extends in the same plane as the bottom of axial/radial groove 33; FIG. 4 actually shows a view onto the bottom of slot 21a. Slot 21a ends in the circumference of the cylindrical outer surface of body 9 and appears as an oblique opening in that surface which extends from a point above the bottom of groove 33, as seen in FIG. 3, down to the axial level of that groove bottom, but azimuthally offset, as can be seen from FIG. 4.

Slots 23 and 24 merge at their other end with notches 25 and 26 respectively in the foot portion, annulus, or shoulder 10. It can be seen from FIG. 4 that the slots 25 and 26 have their walls inclined towards each other at an angle larger than the angle of the slots 23 and 24 to establish thereby a funnel.

Body 9 is provided along its outer periphery with two annular ridges or ribs 27 and 28, being interrupted by slots 23 and 24 which traverse these ribs; but note (FIG. 4) that the radial outer ends of slots 21a and 22a are located not above the notches in ribs 27 and 28, but are azimuthally offset therefrom.

The ribs or ridges are of outwardly tapering configuration. The outer diameter of each rib is larger than the inner diameter of the contact rings 14 and 15. Thus, as body 9 is inserted into socket 13, the ribs are bent a little in axial direction or yield radially, or both; and there is provided a particular pressure force against the contact rings accordingly. The ribs 27 and 28 are spaced axially so that, upon full insertion of body 9 into socket 13, each rib faces and engages one of the contact rings 14 and 15 and in an axially central disposition as far as each contact is concerned.

It will be noted that the bottom of groove 34 is located just a little above rib 27 and the bottom of groove 33 is located above rib 28, but underneath rib 27.

After having described the construction features involved in this particular plug arrangement, I proceed in the description of the assembly process. Originally, parts 5 and 8 are separate parts, and the otherwise embedded leads 2 and 3 extend from the end of body 5 opposite tube 1 housing the thermoactive junction 4. The leads 2 and 3 are radially bent off and carrier member 8 is placed with its shoulder 10 on carrier 5. The claws or latches 11 are spread a little outwardly (radially) and will latch when shoulder 10 abuts the rear face of carrier 5. Member 8 is, of course, placed on carrier 5 so that the notches 25 and 26 are aligned azimuthally with leads 3 and 2.

These leads are now shifted up to pass through grooves 23 and 24 to lodge in ducts 21 and 22, and they are also slipped into slots 21a, 22a to hang out of these slots (21a, 22a) and respectively over the ridges 28 and 27. It will be appreciated that the leads 2 and 3 are being lead laterally and not pushed. This way one avoids bending and kinking. One runs each lead into the proper position in a single manipulating step. Subsequently, the end of lead 2 is cut so that it will not reach ridge 28. The end of lead 3 should also be trimmed.

Independently from the assembly and connection of parts 5 and 8, socket 13 has been inserted into tube 12. Next, member 5 is inserted into the cardboard lance 6 until its end abuts collar 7, and these parts are glued together. Please note that one retains claws 11 in the radius in this manner and carrier member 8 is better secured to carrier member 5 accordingly.

Finally, tube 12 is slid into tube 6 until tubular carrier body 9 is completely inserted in socket 13. The ribs 27 and 28 receive radially effective tension, thereby causing leads 2 and 3 to be urged against contact rings 14 and 15. One will readily see that lead 2 must be cut so that its end remains above contact ring 15 and engages only ring 14.

The invention is not limited to the embodiments described above, but all changes and modifications thereof not constituting departures from the spirit and scope of the invention are intended to be included.

I claim:

1. A plug connector between a thermocouple and a tubular holder for the thermocouple and including a socket member mounted to one end of the tubular holder and defining an opening;

at least one annular contact mounted in the opening of the socket member, the thermocouple being mounted on a carrier from which extend two leads of the thermocouple, the improvement comprising:

a contact carrier on said thermocouple carrier made of electrically insulating material and being mounted to the thermocouple carrier and having at least one annular rib of radially outwardly tapered contour, the rib having an outer diameter slightly larger than an inner diameter of the annular contact;

at least one axially extending, radially inwardly narrowing first slot in the contact carrier, interrupting the annular rib, one of the leads being inserted through the first slot to lodge in a bottom duct of said first slot; and means defining a second slot in the contact carrier, above the first slot but being contiguous with a narrowed portion of said first slot and ending in the outer periphery of the carrier, above said rib and azimuthally offset from said first slot where interrupting the rib, for receiving one lead so that this lead can hang over the rib and engages the contact upon insertion of the carrier into the socket.

2. A plug connector as in claim 1, wherein the contact carrier is provided with a third, axial-radial slot, diametrically opposed to the first slot, the socket having a second annular contact, the contact carrier having a second rib, the ribs being axially spaced commensurate with axial spacing of the annular contacts, the third slot being contiguous with a fourth, generally obliquely extending slot, a second one of the leads being inserted in and running through the third slot, and the fourth slot to hang over the second rib, azimuthally offset from the third slot where interrupting the second rib, and making contact with the second annular contact upon insertion of the carrier in the socket.

3. A plug connection as in claim 1, the thermocouple carrier having a collar being wide in order to prevent the contact carrier from being too deeply inserted into the holder, the collar having a notch contiguous with the first axial slot.

4. A plug connection as in claim 3, there being latch means on the collar for engagement with recesses in the thermocouple carrier.

5. A contact carrier for connection to a thermocouple carrier from which extends at least one lead and for insertion in a socket having at least one annular contact, the combination comprising the contact carrier being of cylindrical construction, having a first axial end face for abutment with the thermocouple carrier and a second axial end face, there being a radial groove in the second end face;

an axial duct traversing the contact carrier and having an entrance opening at a location from which the lead extends from the thermocouple carrier, and ending at its other end in the radial groove;

a slot extending laterally from the groove;

an annular rib on and around the cylindrical carrier, the lead being inserted in the duct axial bore and running through the lateral slot, the lead hanging over the rib; and means for fastening carriers to each other.

6. A contact carrier as in claim 5, including a second bore, second groove, and second lateral slot as well as a second rib axially spaced from the first-mentioned rib, a second lead from the thermocouple carrier, running through the second duct, and the second slot and hanging over the second rib.

7. A contact carrier as in claim 5 or 6, the bore or bores being located at the end of a radial slot or slots.

8. A contact carrier for connection to a thermocouple carrier from which extends at least one lead and for insertion in a socket having at least one annular contact, the combination comprising:

the contact carrier being of cylindrical construction, having a first axial end face for abutment with the thermocouple carrier and a second axial end face, there being a radial groove in the second end face;

a first slot in the contact carrier, extending in radial direction as well as axially from the radial groove to the first axial end face, the lead being received by the first slot;

a second slot in the contact carrier, extending obliquely to an axis of the contact carrier as well as to a radial direction from an axial level corresponding to a bottom of the radial groove and toward the second end face, and communicating with the first slot; and an annular rib, being interrupted by the first slot and extending in an axial level away from the bottom toward the first end face.

* * * * *